J. F. Seiberling.

Harvester Dropper.

No 1700 Reissued Jun. 14, 1864.

Witnesses,
G. Breed
A. Baum

Inventor.
John F. Seiberling
Daniel Breed
Attorney.

J. F. Seiberling.

Harvester Dropper.

No. 1700 Reissued Jun. 14, 1864.

Witnesses.

G. Breed
A. Bruce

Inventor

John F. Seiberling
Daniel Breed
Attorney.

UNITED STATES PATENT OFFICE.

JOHN F. SEIBERLING, OF DOYLESTOWN, OHIO.

IMPROVEMENT IN HARVESTERS.

Specification forming part of Letters Patent No. 33,496, dated October 15, 1861; Reissue No. 1,700, dated June 14, 1864.

DIVISION C.

*To all whom it may concern:*

Be it known that I, JOHN F. SEIBERLING, of Doylestown, in the county of Wayne and State of Ohio, have invented a new and useful Improvement in Harvesters; and I do hereby declare that the following is a full and exact description thereof, reference being had to the accompanying drawings, and to the letters of reference marked thereon.

The gavel, as discharged from harvesters by the common dropping or tilting platform, comes in contact with the stubble only behind the platform. Therefore, if the drop or tilt of the platform fail to throw off the gavel, the latter may be dragged and entangled.

The chief object of my invention is to bring the gavel, while it is upon the platform or dropper, more fully in contact with the stubble, and thus to employ more effectually the seizing or grappling power of the stubble in holding the gavel where it and the dropper first fall, and at the same time to lessen the friction of the tilting platform or dropper upon the gavel as the machine is drawn away.

My invention consists, mainly, in a slotted or fingered dropper or platform, through which the stubble can penetrate and seize the gavel, thus holding the latter while the dropper is dragged away; and, secondly, in the combination of the slotted dropper with a cut-off and finger-beam.

Figure 1:
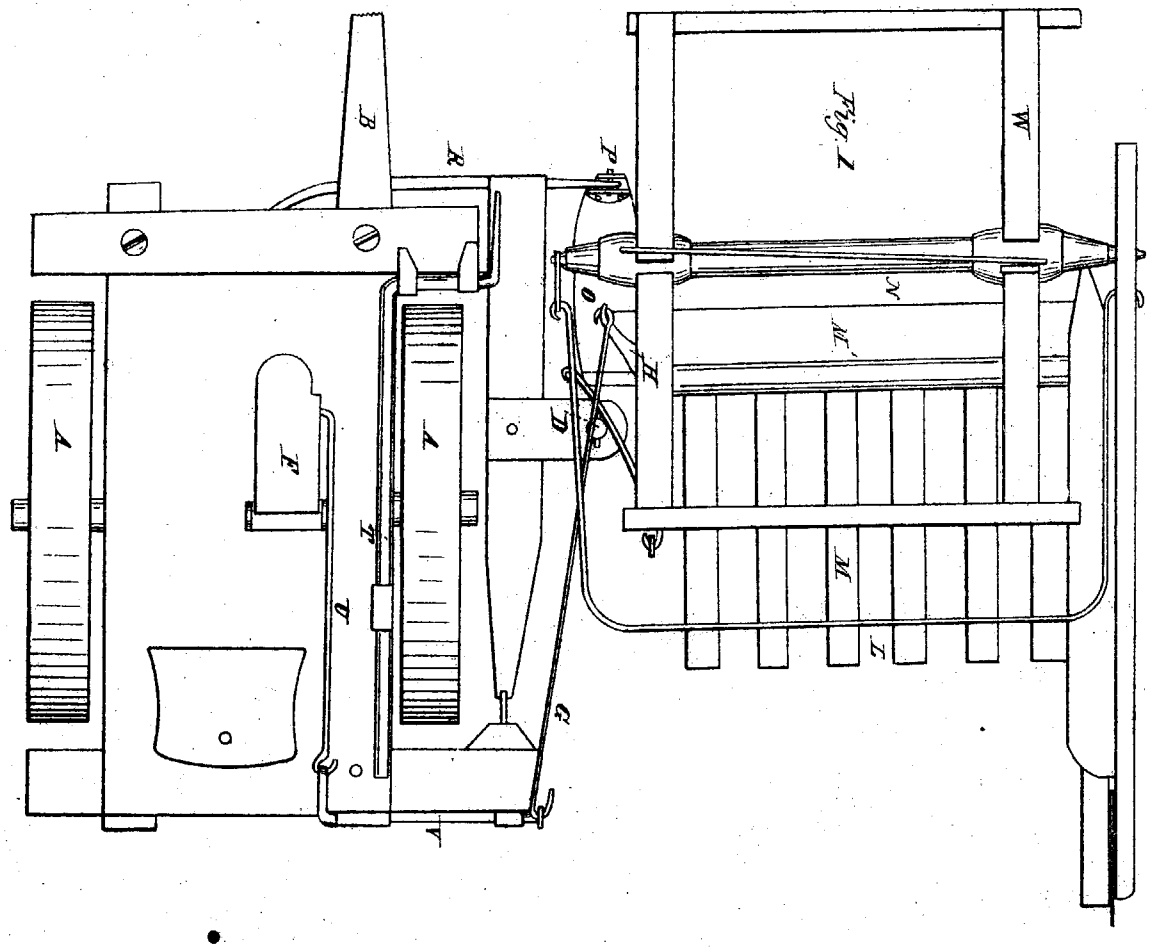
Figure 2:
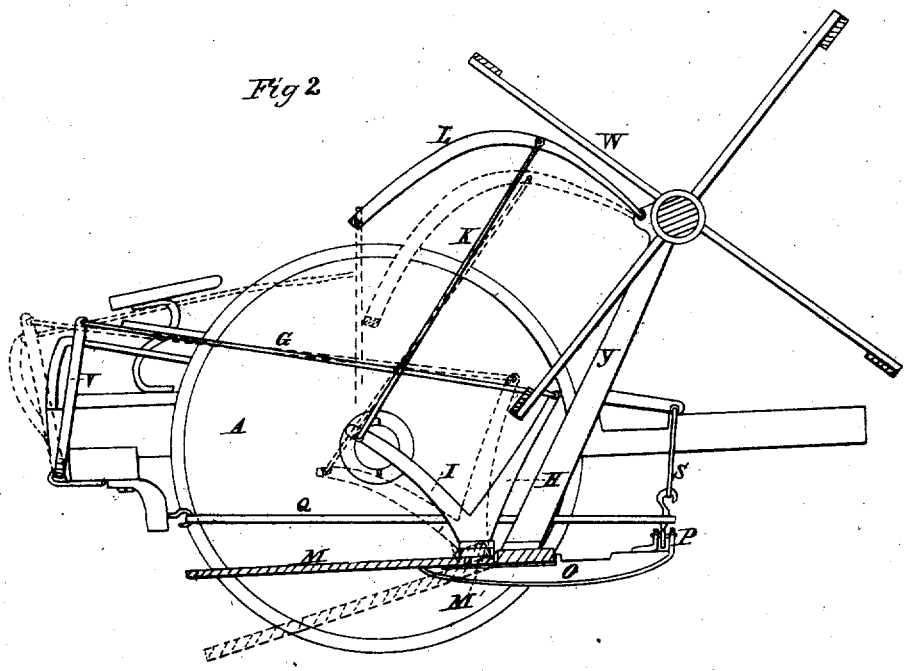

In the accompanying drawings, Figure 1 is a top view of my harvester. Fig. 2 is a longitudinal vertical section of the same, the section being made through the reel and platform.

Instead of the ordinary dropping platform, I employ a slotted or finger dropper, as shown in Figs. 1 and 2 at M M′. This dropper is placed behind the finger-beam N, like a tilting platform, and consists of a rock-shaft, M′, with a series of fingers, M. These fingers are placed near enough together to receive and support the gavel until the dropper is let fall, and yet they are far enough apart to allow a large amount of stubble to penetrate between the fingers when they fall with the gavel. The fingers are made very smooth in order to prevent friction or dragging the gavel as the dropper is drawn away. This construction allows the stubble to seize the gavel where it first falls with the dropper, and thus hold the gavel stationary while the machine moves forward.

My harvester has a peculiar arrangement for tilting the dropper. A lever, H, is firmly attached to the rock-shaft M′ and connected by rod G to an elbow-lever, V, which is connected by rod U to the treadle F. By means of this arrangement, the driver, with his foot upon the treadle, can rock the shaft M′, and thus raise or lower the fingers M at pleasure. Attached to the reel is a cut-off, L, so arranged as to be capable of elevation and depression at the will of the driver. This cut-off, when elevated, rides clear of the tops of the grain; but when depressed it arrests the fall of the cut grain, holding the latter as it accumulates until the completed gavel is discharged. By means of the lever I and rod K, the driver, in operating the dropper, also operates simultaneously the cut-off L.

The operation of my machine is as follows: Both the dropper and cut-off being elevated, the machine proceeds in the usual manner until a gavel has accumulated upon the dropper. Then the driver lets dropper and cut-off fall suddenly. The dropper being fingered or slotted, the stubble penetrates between the fingers and seizes the gavel, holding the same where it fell, while the fingers are drawn out from under the gavel. The cut-off, falling simultaneously with the dropper, promptly arrests the further accumulation of grain upon the fingers M until the machine advances clear of the gavel just discharged. Then the driver elevates both fingers M and cut-off L. This motion discharges the grain from the cut-off and lets the same fall smooth upon the dropper. Thus the gavel is deposited from the machine without entangling the grain. Not only is my improved machine very successful in discharging the gavel, but the draft also is very sensibly diminished by the use of the open fingers M, which have little friction when drawn in discharging the gavel.

Having thus described my invention, what I claim, and desire to secure by Letters Patent of the United States, is—

1. The slotted dropping platform through which the stubble penetrates and seizes the gavel while the platform is drawn away for the purpose of discharging the grain, substantially as described.

2. The combination of the slotted dropper M, the cut-off L, and the finger-beam, substantially as described.

JOHN F. SEIBERLING.

Witnesses:
AMOS HENRICKS,
ABRAHAM B. CAPP.